US008817856B2

(12) United States Patent
Kim et al.

(10) Patent No.: US 8,817,856 B2
(45) Date of Patent: Aug. 26, 2014

(54) METHOD AND APPARATUS FOR CONTROLLING SUSPEND MODE IN DUAL MODEM DEVICE

(75) Inventors: Bosoo Kim, Seoul (KR); Seongjin Park, Anyang-si (KR); Seungmin Jeong, Anyang-si (KR); Juno Jung, Gwangmyeong-si (KR); Jungok Cho, Seoul (KR); Changjae Lee, Cheonan-si (KR); Kwangsik Kong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 13/053,080

(22) Filed: Mar. 21, 2011

(65) Prior Publication Data

US 2011/0292979 A1 Dec. 1, 2011

Related U.S. Application Data (60) Provisional application No. 61/349,201, filed on May 27, 2010.

(30) Foreign Application Priority Data

Oct. 29, 2010 (KR) ........................ 10-2010-0106820

(51) Int. Cl.
*H04B 1/38* (2006.01)
*G06F 1/32* (2006.01)
*H04W 52/02* (2009.01)
*H04W 88/06* (2009.01)

(52) U.S. Cl.
CPC ............. *G06F 1/3278* (2013.01); *H04W 88/06* (2013.01); *H04W 52/0274* (2013.01); *Y02B 60/126* (2013.01)
USPC .......................................... 375/222; 455/557

(58) Field of Classification Search
CPC .... H04W 88/06; H04W 52/287; Y02B 60/50; Y02B 60/34; Y02B 60/126; H04L 12/50; H04L 12/12; G06F 1/3203; G06F 1/3287; G06F 1/3278
USPC ................ 372/222; 455/343.2, 557; 709/232; 713/320
See application file for complete search history.

(56) References Cited

U.S. PATENT DOCUMENTS

2001/0034246 A1* 10/2001 Hutchison et al. ............ 455/557
2003/0191854 A1* 10/2003 Hsu et al. ...................... 709/233
(Continued)

FOREIGN PATENT DOCUMENTS

JP     2003-244316    8/2003
JP     2004-030506    1/2004
(Continued)

*Primary Examiner* — Aristocratis Fotakis
(74) *Attorney, Agent, or Firm* — Lee, Hong, Degerman, Kang & Waimey (57) ABSTRACT

A dual modem device is provided. The dual modem device includes a first processor for communicating with a first network and a second processor for communicating with a second network and the second processor includes a host module for controlling the first processor. The first processor includes a first processor side IPC (Inter-Processor Communication) for transceiving signals with the second processor and the second processor further includes a second processor side IPC for transceiving signals with the first processor. The second processor transfers a suspend message to the first processor for shifting to a suspend mode and configures the second processor side IPC to not work. The first processor receives the operating suspend message, transfers a suspend response message to the second processor and configures the first processor side IPC to not work.

10 Claims, 5 Drawing Sheets

(56) References Cited

U.S. PATENT DOCUMENTS

| | | |
|---|---|---|
| 2005/0086550 A1 | 4/2005 | Hammes et al. |
| 2007/0140199 A1* | 6/2007 | Zhao et al. ............... 370/338 |
| 2008/0052493 A1 | 2/2008 | Chang |
| 2008/0307240 A1 | 12/2008 | Dahan et al. |
| 2009/0180451 A1* | 7/2009 | Alpert et al. ............ 370/338 |
| 2010/0083026 A1* | 4/2010 | Millet et al. ............. 713/601 |
| 2010/0135206 A1* | 6/2010 | Cherian et al. .......... 370/328 |
| 2010/0325335 A1* | 12/2010 | Kim et al. ................ 710/316 |
| 2011/0110256 A1* | 5/2011 | Han et al. ................ 370/252 |
| 2011/0199963 A1* | 8/2011 | Shaw ....................... 370/328 |

FOREIGN PATENT DOCUMENTS

| | | |
|---|---|---|
| JP | 2005-295532 | 10/2005 |
| JP | 2006-254422 | 9/2006 |
| JP | 2010-109959 | 5/2010 |

\* cited by examiner

METHOD AND APPARATUS FOR CONTROLLING SUSPEND MODE IN DUAL MODEM DEVICE

CROSS-REFERENCE TO RELATED APPLICATIONS

Pursuant to 35 U.S.C. §119(e), this application claims the benefit of U.S. Provisional Patent Application No. 61/349,201, filed on May 27, 2010, the contents of which is hereby incorporated by reference herein in its entirety. Pursuant to 35 U.S.C. §119(a), this application claims the benefit of earlier filing date and right of priority to Korean Patent Application No. 10-2010-0106820, filed on Oct. 29, 2010, the contents of which is incorporated by reference herein in its entirety.

FIELD OF THE INVENTION

The present invention is directed to a dual modem device, and more particularly, to a method and apparatus for controlling a suspend mode in the dual mode device.

DESCRIPTION OF THE RELATED ART

Wireless mobile communication technology is being rapidly developed not only in voice communication but also in high speed transmission/reception of data. A fourth generation mobile communication technology, such as a Long Term Evolution (LTE) wireless communication system, is a focus of attention. However, when a fourth generation communication network and a third generation communication network are present together, a mobile communication terminal or a mobile communication data card must include not only fourth generation mobile communication technology but also third generation mobile communication technology that is in wide use. Therefore, in order to simultaneously support the next generation mobile communication technology and the legacy mobile communication technology, a mobile communication device having different modems and processors and a data-card type dual-modem device are needed.

A dual-modem device includes two modems having different communication schemes such that different communication schemes can be supported using the two modems. Generally, dual-modem devices have been widely used in a region including heterogeneous communication networks.

As representative examples of a dual-modem device, a Long Term Evolution (LTE) wireless communication device and a Code Divisional Multiple Access (CDMA) communication device are being intensively researched by many developers and companies. Although the present invention is disclosed with respect to a dual-modem device capable of communicating with all LTE and CDMA networks, the scope or spirit of the present invention is not so limited and can also be applied to other wireless communication networks as necessary.

SUMMARY OF THE INVENTION

In one aspect of the present invention, a dual-modem device is provided. The dual-modem device includes a first processor configured to communicate with a first network and a second processor configured to communicate with a second network, the second processor including a host module for controlling the first processor, the second processor further including a second processor side IPC (Inter-Processor Communication) configured to transceive signals with the first processor and further configured to transmit a suspend message to the first processor for shifting to a suspend mode and to configure the second processor side IPC to not work, the first processor including a first processor side IPC configured to transceive signals with the second processor and further configured to transmit a suspend response message to the second processor in response to the suspend message and to configure the first processor side IPC to not work.

It is contemplated that the second processor further includes a hardware module configured to transmit the suspend message and receive the suspend response message and the first processor further includes a hardware module configured to receive the suspend message and transmit the suspend response message. It is further contemplated that the first processor is further configured to transmit a suspend release message via its hardware module after receiving data from the first network and to configure the first processor side IPC to work and the second processor is further configured to receive the suspend release message via its hardware module and to configure the second processor side IPC to work.

It is contemplated that the first processor is further configured to transmit the data to the second processor after configuring the first processor side IPC to work and the second processor is further configured to receive the data from the first processor after configuring the second processor side IPC to work. It is further contemplated that the first processor is further configured to disconnect at least one of a plurality of PDNs (Packet Data Network) that are connected to the first network after elapse of a predetermined amount of time when the second processor shifts to the suspend mode.

It is contemplated that the plurality of PDNs include an IMS (IP Multimedia Subsystem) PDN, an Internet PDN, an Administrative PDN, and a branded PDN. It is further contemplated that the at least one of the plurality of PDNs includes at least the Internet PDN or the branded PDN.

It is contemplated that the first processor is further configured to suspend transmission of data of a PDN that is currently communicating with the first network and to store a suspend point of transmitting the data before the second processor shifts to the suspend mode. It is further contemplated that the first processor side IPC and the second processor side IPC each are SDIO (Secure Digital Input Output) modules. Preferably, the first processor is further configured to communicate data with the first network via the host module of the second processor.

In another aspect of the present invention, a method of controlling a dual-modem device is provided. The method includes communicating with a first network via a first processor, communicating with a second network via a second processor, controlling the first processor via a host module in the second processor, transceiving signals between the first processor and the second processor via a first processor side IPC (Inter-Processor Communication) in the first processor and a second processor side IPC in the second processor, transmitting a suspend message from the second processor to the first processor for shifting to a suspend mode and configuring the second processor side IPC to not work and transmitting a suspend response message from the first processor to the second processor in response to the suspend message and configuring the first processor side IPC to not work.

It is contemplated that the suspend message is transmitted and the suspend response message is received via a hardware module in the second processor and the suspend message is received and the suspend response message is transmitted via a hardware module in the first processor. It is further contemplated that the method further includes transmitting a suspend release message from the first processor to the second processor after the first processor receives data from the first network and configuring the first processor side IPC to work and configuring the second processor side IPC to work after the second processor receives the suspend release message.

It is contemplated that the method further includes transmitting, by the first processor, the data to the second processor after configuring the first processor side IPC to work and receiving, by the second processor, the data from the first processor after configuring the second processor side IPC to work. It is further contemplated that the method further includes disconnecting, by the first processor, at least one of a plurality of PDNs (Packet Data Network) that are connected to the first network after elapse of a predetermined amount of time when the second processor shifts to the suspend mode.

It is contemplated that the plurality of PDNs include an IMS (IP Multimedia Subsystem) PDN, an Internet PDN, an Administrative PDN, and a branded PDN. It is further contemplated that the at least one of the plurality of PDNs includes at least the Internet PDN or the branded PDN.

It is contemplated that the method further includes suspending, by the first processor, transmission of data of a PDN that is currently communicating with the first network and storing a suspend point of transmitting the data before the second processor shifts to the suspend mode. It is further contemplated that the first processor side IPC and the second processor side IPC each are SDIO (Secure Digital Input Output) modules. Preferably, the method further includes communicating, by the first processor, data with the first network via the host module in the second processor.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Hereinafter, the preferred embodiments of the present invention will be described with reference to the accompanying drawings. It is to be understood that the detailed description that is disclosed along with the accompanying drawings is intended to describe the exemplary embodiments of the present invention, and is not intended to describe a unique embodiment with which the present invention can be carried out.

Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a $3^{rd}$ Generation Partnership Project Long Term Evolution (3GPP LTE) system, but the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference designators will be used throughout the drawings to refer to the same or like items. In the following description, it is assumed that a terminal or device is a mobile or fixed user end device, such as a user equipment (UE) or a mobile station (MS), and a base station is a node of a network end communicating with a terminal or device, such as a Node-B, an eNode B, or a base station.

Figure 1:
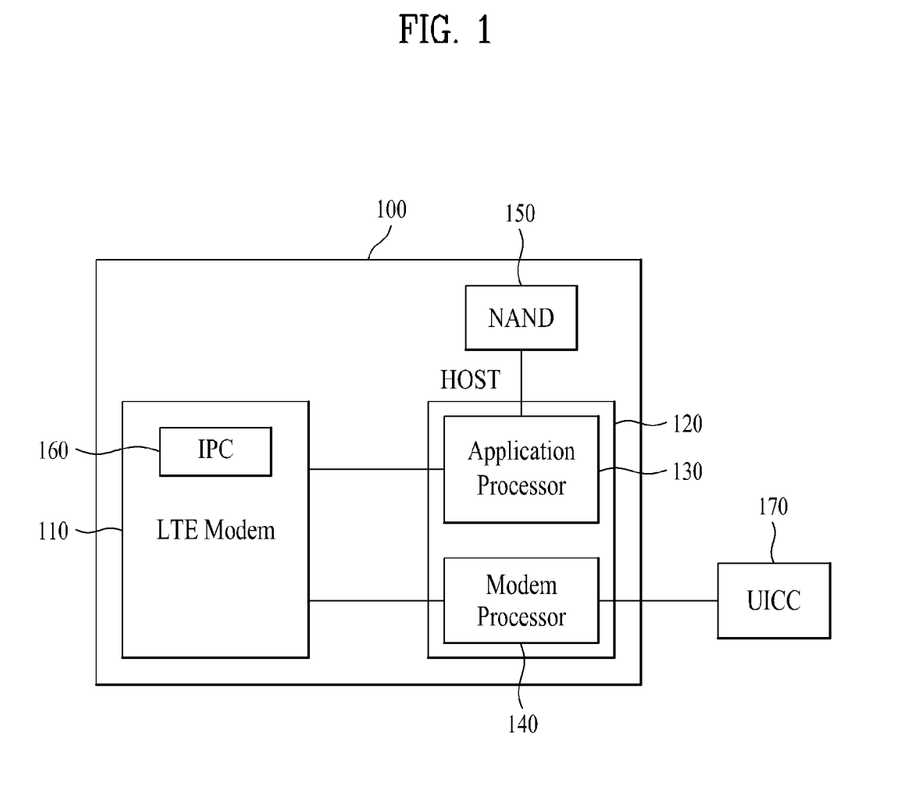
FIG. 1 is a block diagram for a dual modem device according to an embodiment of the present invention.

FIG. 1 is a block diagram for a dual modem device 100 according to an embodiment of the present invention. It will be apparent to those skilled in the art to which the present invention is related that the dual modem device 100 can be a device of any type having a plurality of modems that is accessible to a heterogeneous network.

Referring to FIG. 1, the dual modem device 100 according to the present invention includes a host processor 120 for communication with a CDMA communication network and an LTE modem 110 for communication with an LTE communication network. The host processor 120 may include a host module for processing applications and controlling the LTE modem 110, such as an application processor 130, and a modem processor 140 for communication with the CDMA communication network. The dual modem device 100 includes a NAND flash memory 150 connected to the host processor 120 as a storage means for the device.

The LTE modem 110 transmits signals to and receives signals from the host processor 120 using a secure digital input output (SDIO) that is an IPC (Interprocess Communication) interface 160, such as SDIO (Secure Digital Input Output), USB (Universal Serial Bar), shared memory, or UART (Universal Asynchronous Receiver/Transmitter). Specifically, the LTE modem 110 transmits LTE data and control signals to and receives LTE data and control signals from the application processor 130 of the host processor 120 using the SDIO. Further, the LTE modem 110 transmits control signals associated with a handover procedure to and receives control signals associated with a handover procedure from the modem processor 140 of the host processor 120 using the UART.

The modem processor 140 of the host processor 120 performs inter-RAT (radio access technology) handover control, inter-RAT signal quality control, service control, QoS (quality of service) control, and IP (internet protocol) address session control. A UICC (universal integrated circuit card) 170 is connected to the host processor 120. The modem processor 140 of the host processor 120 controls the UICC 170.

The UICC 170 includes a USIM (universal subscriber identity module), a CSIM (CDMA subscriber identity module) and an ISIM (IP multimedia services identity module). The USIM generally includes network parameters related to the LTE communication network and authentication associated applications. The CSIM includes network parameters related to the CDMA communication network and authentication associated applications. The ISIM includes parameters and applications for providing IP multimedia services.

For clarity, the following description is made with reference to the configuration of the dual modem device 100 shown in FIG. 1 unless otherwise indicated. The LTE communication network generally uses PDN (Packet Data Network) to provide service. By using the PDN, a device is allocated IP (Internet Protocol) and configures QoS (Quality of Service).

As smart phones are developed, they are required to process a plurality of applications at once, (referred to as "multitasking"). Services provided by each of the applications have different QoS and can connect with different PDN. PDNs include IMS (IP Multimedia Subsystem) PDN, Internet PDN, Administrative PDN, and Branded PDN.

On the other hand, in the dual modem device 100, specifically a smart phone having a dual modem, there is a maximum power saving mode for managing power. The maximum power saving mode is referred as a suspend mode. If the dual modem device 100 shifts from a normal mode to the suspend mode, the host processor 120 enters the maximum power saving mode and a plurality of functions for controlling the LTE modem 110 are stopped.

When the dual modem device 100 shifts from a normal mode to the suspend mode, it is necessary to maintain connection with indispensable PDNs and to wake up the host processor 120 by using data received from the LTE communication network. The present invention provides several methods for providing these functions.

FIGS. 2 to 5 disclose signal flow between the LTE modem 110 and the application processor (AP) 130 of the host processor 120. Specifically, the AP 130 includes an LTE CM (Connection Manager) for controlling the LTE modem 110 and processing the LTE data. The AP 130 further includes a device driver for controlling the IPC interface 160.

Figure 2:
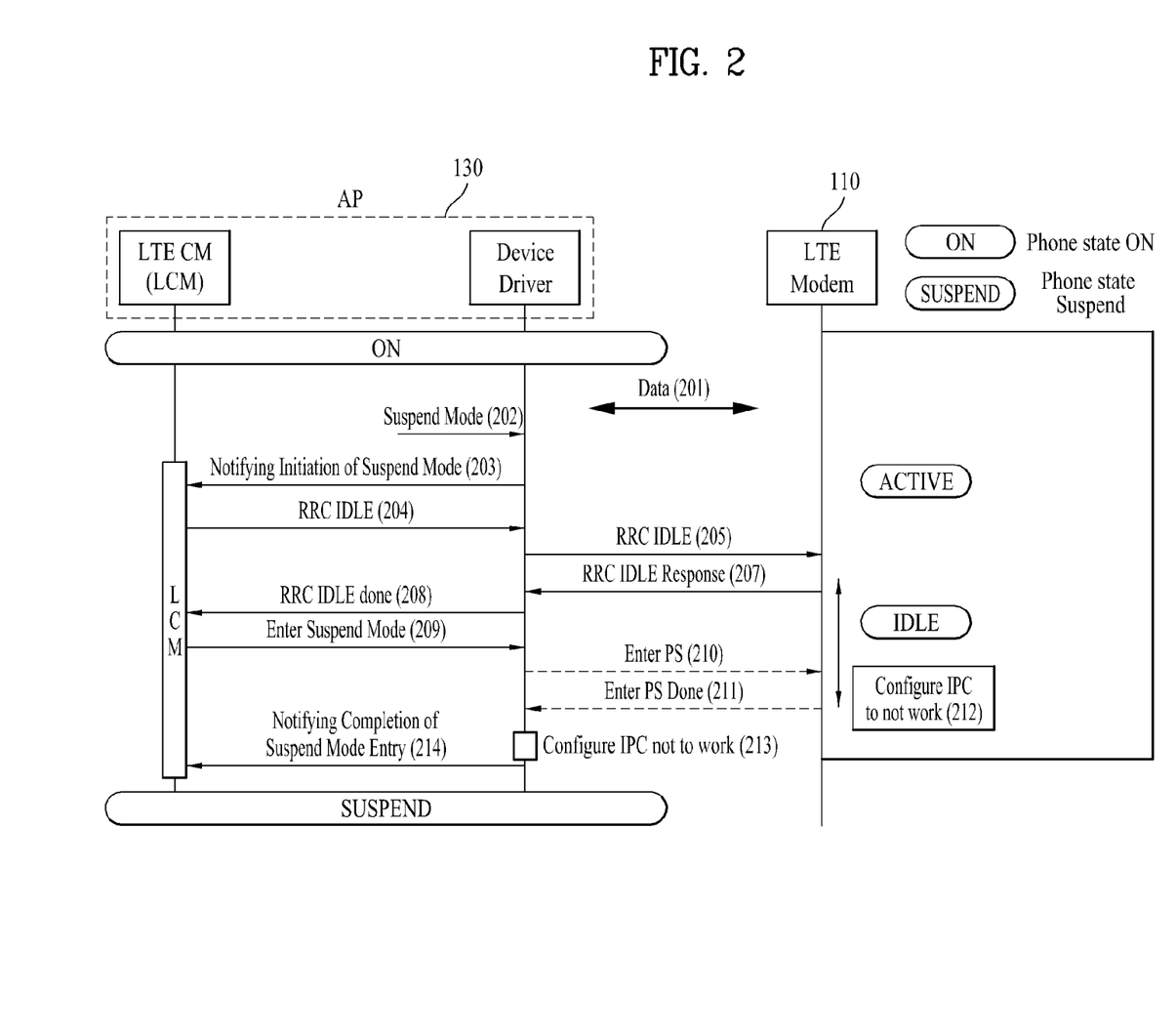
FIG. 2 illustrates a method for shifting to a suspend mode in a dual modem device according to an embodiment of the present invention.

FIG. 2 illustrates a method for shifting to a suspend mode in a dual modem device 100 according to an embodiment of the present invention. In FIG. 2, it is assumed that the AP 130 and the LTE modem 110 receive data from and transmit data to the LTE communication network (S201). The data is not processed directly in the LTE modem 110, but rather is processed indirectly through the host processor 120. According to a user request or the elapse of a specific period of time, a command for shifting to the suspend mode is forwarded to the device driver (S202).

The device driver notifies initiation of a procedure for shifting to the suspend mode to the LTE CM (S203). In response to the notification, the LTE CM transfers a radio resource control (RRC) IDLE command to the device driver in order to stop transmission or reception with the LTE communication network (S204). The device driver then forwards the RRC IDLE command to the LTE modem 110 via the SDIO, which is the IPC interface 160 (S205).

The LTE modem 110 then suspends processing of the LTE data and shifts to IDLE state. At the same time, the LTE modem 110 transfers an RRC IDLE response signal to the device driver via the SDIO, which is an IPC interface (S207) and the device driver forwards the RRC IDLE response signal to the LTE CM (S208).

The LTE CM that received the RRC IDLE response signal transfers a command for shifting to the suspend mode to the device driver (S209). The device driver transmits a message to terminate processing, specifically an Enter PS message, to the LTE modem 110 (S210). The LTE modem 110 receives the Enter PS message and transmits an Enter PS Done message, which is a response message for notifying entry into the maximum power saving mode, to the device driver (S211). At the same time, the LTE modem 110 configures the IPC interface 160 to not work (S212).

The device driver that received the Enter PS Done message configures the IPC interface of the host processor 120 not to work (S213). The device driver then transmits a response message to the LTE CM for notifying completion of shifting to the suspend mode (S214).

Specifically, the Enter PS message transmitted by the device driver to the LTE modem 110 (S210) and the Enter PS Done message transmitted by the LTE modem to the device driver (S211) are transferred by using separate hardware signals instead of by using the IPC interface. The separate hardware signals are provided by pins for the Enter PS message and the Enter PS Done message, which are hardware modules.

Figure 3:
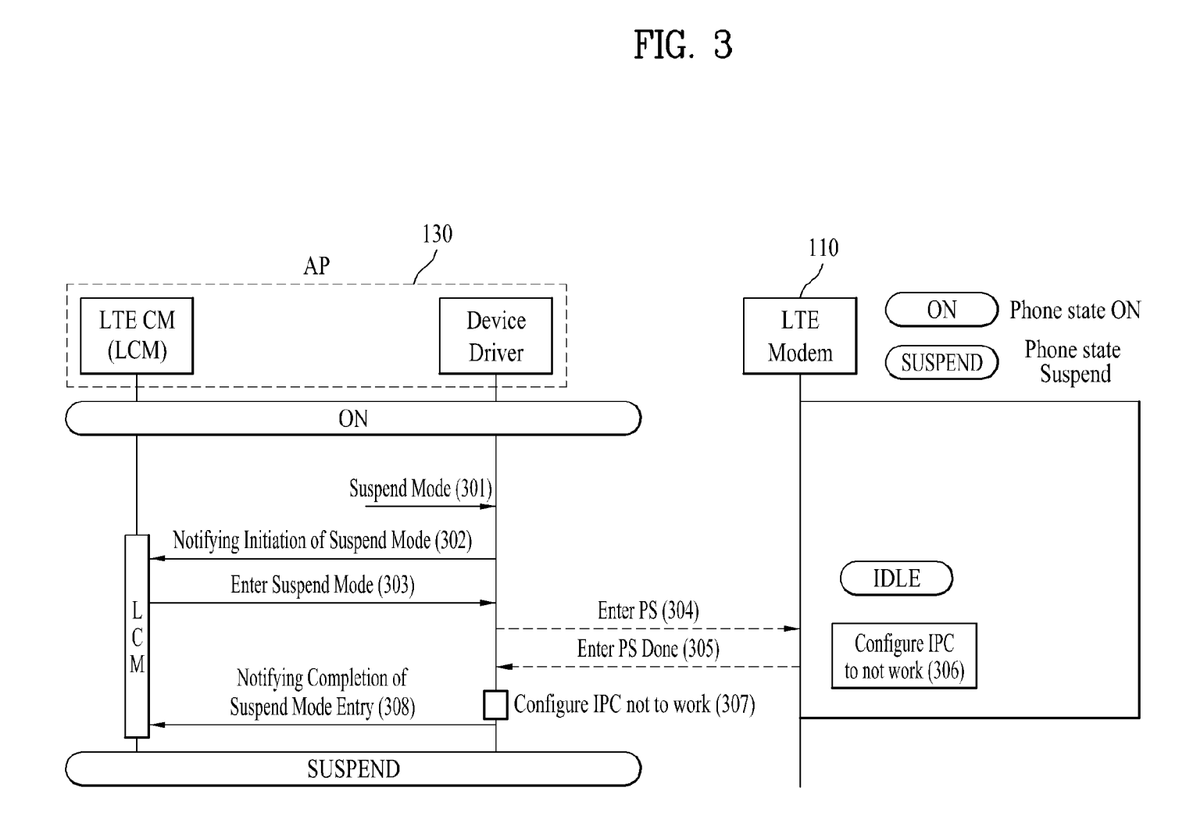
FIG. 3 illustrates a method for shifting to a suspend mode in a dual modem device according to another embodiment of the present invention.

FIG. 3 illustrates a method for shifting to a suspend mode in a dual modem device 100 according to another embodiment of the present invention. In FIG. 3, it is assumed that the LTE modem 110 does not receive data from or transmit data to the LTE communication network because the LTE modem is the idle state. A command for shifting to the suspend mode is forwarded to the device driver (S301) according to a user request or the elapse of a specific period of time.

The device driver notifies initiation of a procedure for shifting to the suspend mode to the LTE CM (S302). In response to the notification, the LTE CM transfers a command for shifting to the suspend mode to the device driver (S303). The device driver then transmits a message to terminate processing, which is an Enter PS message, to the LTE modem 110 (S304). The LTE modem 110 that received the Enter PS message transmits an Enter PS Done message, which is a response message for notifying entry into the maximum power saving mode, to the device driver (S305). The LTE modem 110 then configures the IPC interface 160 to not work (S306).

The device driver that received the Enter PS Done message configures the IPC interface of the host processor 120 to not work (S307). The device driver transmits a response message to the LTE CM for notifying completion of shifting to the suspend mode (S308).

The Enter PS message transmitted by the device driver to the LTE modem 110 (S304) and the Enter PS Done message transmitted from the LTE modem to the device driver (S305) are transferred by using separate hardware signals instead of by using the IPC interface. The separate hardware signals are provided by pins for the Enter PS message and the Enter PS Done message, which are hardware modules.

Figure 4:
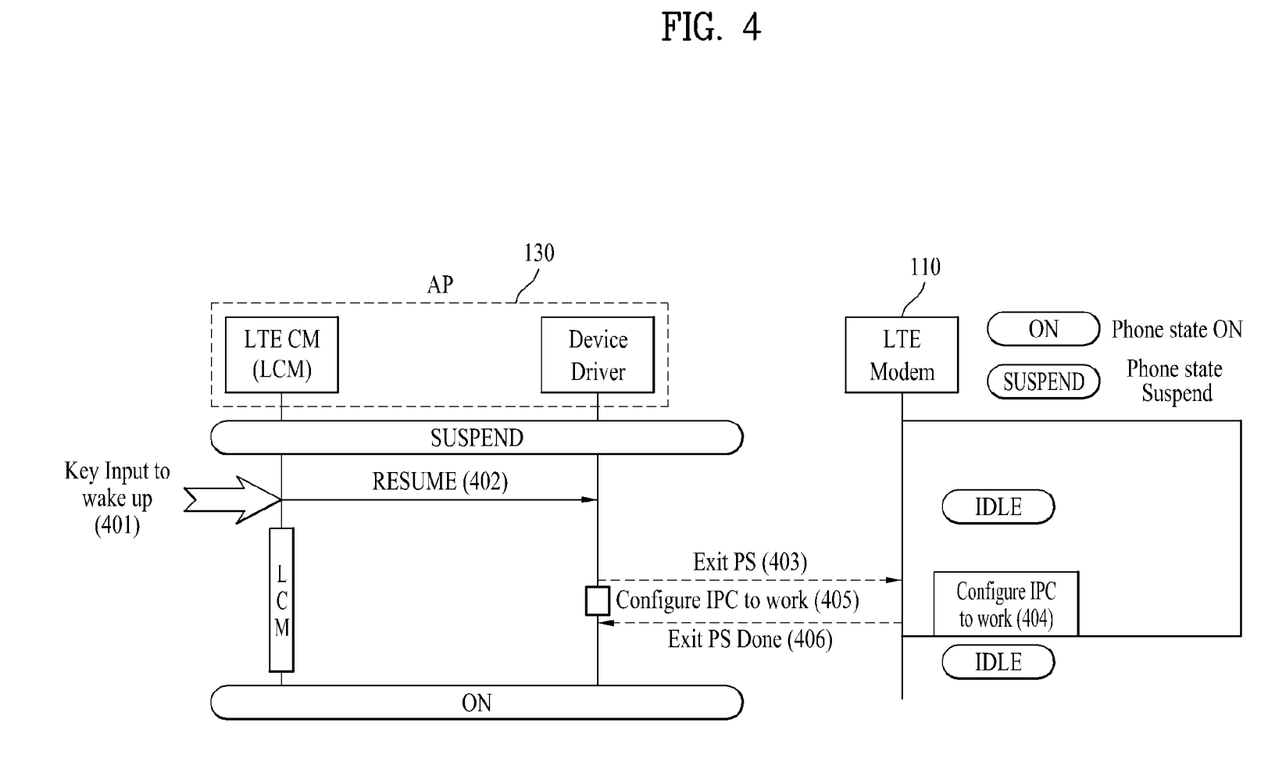
FIG. 4 illustrates a method for waking up from a suspend mode in a dual modem device according to an embodiment of the present invention.

FIG. 4 illustrates a method for waking up from a suspend mode in a dual modem device 100 according to an embodiment of the present invention. As shown in FIG. 4, the LTE CM receives a command from a user to wake up from the suspend mode (S401). For example, the command may be generated by operating a key separately configured to wake up from the suspend mode, such as a power-on key.

The LTE CM transfers a RESUME command to the device driver (S402) and the device driver transmits an Exit PS message, which is a command to wake up from an idle state, to the LTE modem 110 (S403). The LTE modem 110 that received the Exit PS message configures the IPC interface 160 to work (S404). The LTE modem 110 then transmits an Exit PS Done message to the device driver for notifying waking up from the maximum power saving mode (S406). Finally, the device driver that received the Exit PS Done message configures the IPC interface of the host processor 120 to work (S405)

As in FIG. 2 and FIG. 3, the Exit PS message and the Exit PS Done message are transferred by using separate hardware signals instead of by using the IPC interface. The separate hardware signals are provided by pins for the Enter PS message and the Enter PS Done message, which are hardware modules.

Figure 5:
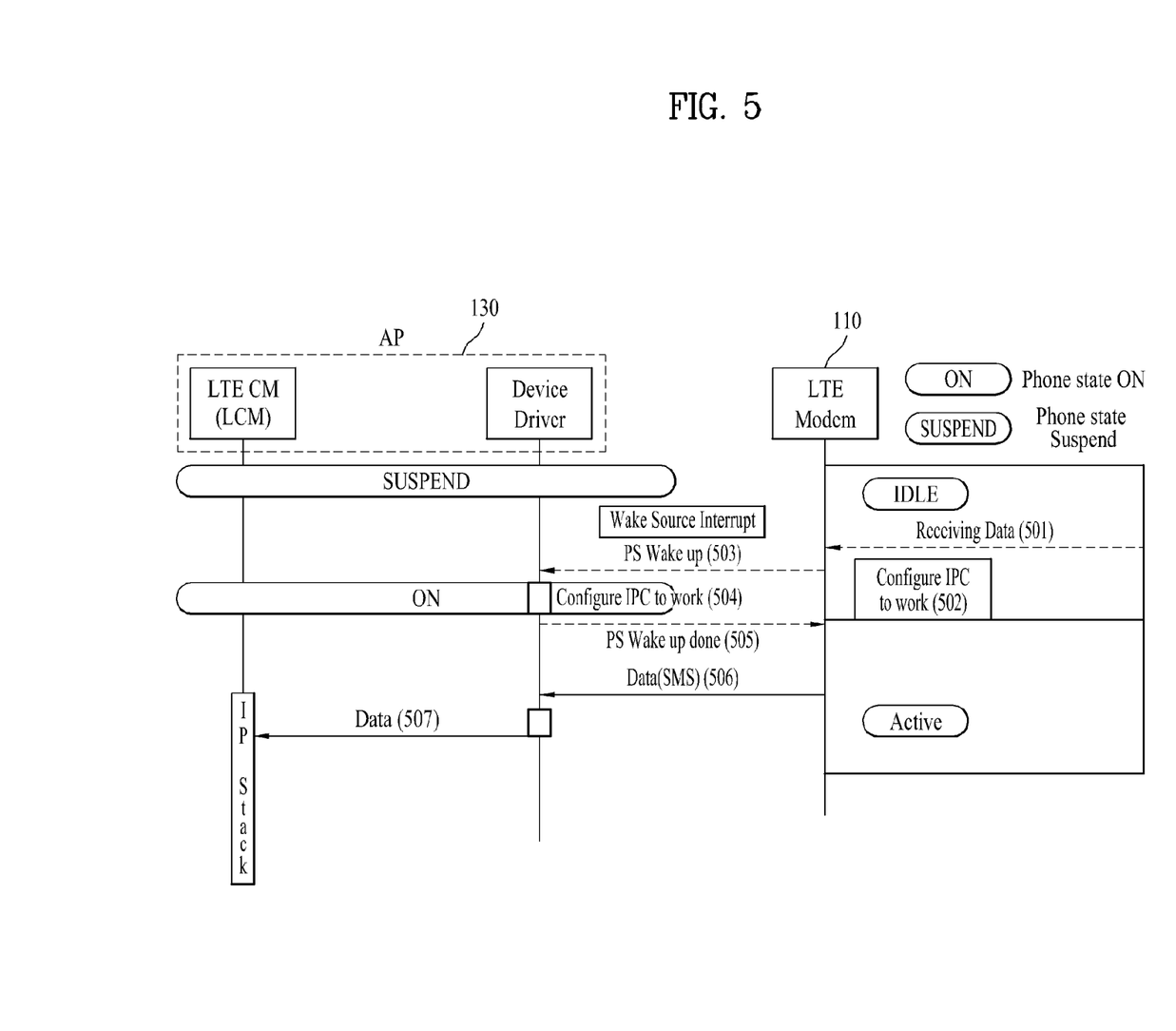
FIG. 5 illustrates a method for waking up from a suspend mode in a dual modem device according to another embodiment of the present invention.

FIG. 5 illustrates a method for waking up from a suspend mode in a dual modem device 100 according to another embodiment of the present invention. As illustrated in FIG. 5, the LTE modem 110, which is in an idle state, receives data from the LTE communication network (S501). For example, the LTE modem 110 receives an SMS (Short Messaging Service) from the LTE communication network. The LTE modem 110 that received the data configures the IPC interface 160 to work (S502) and then transmits a PS Wake up message to the device driver for configuring the host processor 120 to wake up from the suspend mode (S503).

The device driver that received the PS Wake up message configures the IPC interface of the host processor 120 to work (S504). Further, in the response to the PS Wake up message, the device driver transmits a PS Wake up Done message to the LTE modem 110 (S505).

The LTE modem 110 then shifts to an active state and forwards the data received from the LTE communication network to the device driver of the host processor 120 via the SDIO, which is an IPC interface (S506). Finally, the device driver transfers the data to the LTE CM (S507), in order to process the data at an IP stack.

As in FIGS. 2 to 4, the PS Wake up message and the PS Wake up Done message are transferred by using separate hardware signals instead of by using the IPC interface. The separate hardware signals are provided by pins for the Enter PS message and the Enter PS Done message, which are hardware modules.

The following description is related to a method for controlling connection of a plurality of PDNs to the dual modem device 100 of the present invention when shifting to the suspend mode. In order to perform services, the dual modem device 100 of the present invention can connect with the IMS PDN, the Internet PDN, the Administrative PDN, and the branded PDN.

When shifting to the suspend mode, maintaining all connections with the above mentioned PDNs is considered. More specifically, an operation of only the AP 130 is suspended while maintaining the connections with the LTE communication network by blocking the SDIO, which is the IPC interface 160 between the AP and the LTE modem 110.

Preferably, PDNs having low priority among the above mention PDNs, such as the Internet PDN and the branded PDN, can be configured to disconnect from the LTE communication network when a pre-determined time elapses. On the other hand, if at least one specific application is operating when shifting to the suspend mode, maintaining the connection of PDN to the at least one specific application is considered regardless of priority. A method for releasing the connections of remaining PDNs, except for the IMS PDN and the Administrative PDN, by using only an RRC IDLE command in the LTE modem 110 is also considered. Finally, if data of the IMS PDN or the Administrative PDN is being transmitted when shifting to the suspend mode, it is preferable to suspend data transmission, store the suspend point, and then shift to the suspend mode.

The embodiments disclosed herein are achieved by a combination of structural elements and features of the present invention in a predetermined manner. Each of the structural elements or features should be considered selectively unless specified separately. Each of the structural elements or features may be carried out without being combined with other structural elements or features. Some structural elements and/or features may also be combined with one another to constitute the embodiments of the present invention.

The order of operations described in the embodiments of the present invention may be changed. Some structural elements or features of one embodiment may be included in another embodiment, or may be replaced with corresponding structural elements or features of another embodiment.

It will be apparent that some claims referring to specific embodiments may be combined with another claims referring to embodiments other than the specific embodiments to constitute an embodiment. Furthermore, new claims may be added by means of amendment after the application is filed.

The embodiments of the present invention have been described based on the data transmission and reception between a base station and a user equipment. A specific operation which has been described as being performed by the base station may be performed by an upper node of the base station as needed. In other words, it will be apparent that various operations performed for communication with the user equipment in the network which includes a plurality of network nodes along with the base station can be performed by the base station or network nodes other than the base station.

The term base station may be used interchangeably with terms such as a fixed station, Node B, eNode B (eNB), and access point. Also, the term user equipment may be used interchangeably with terms such as mobile station (MS) and mobile subscriber station (MSS).

The embodiments according to the present invention can be implemented by various means, for example, hardware, firmware, software, or a combination of hardware, firmware, and/or software. If an embodiment according to the present invention is implemented by hardware, it can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

If an embodiment according to the present invention is implemented by firmware or software, it may be implemented by a module, a procedure, or a function, which performs the described functions or operations. Software code may be stored in a memory unit and then may be driven by a processor. The memory unit may be located inside or outside the processor and may transmit data to and receive data from the processor through various means which are well known.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A dual-modem device comprising:
   a first processor configured to communicate with a first network;
   a second processor configured to communicate with a second network; and
   a hardware module configured to transceive messages between the first processor and the second processor,
   wherein the second processor includes a host module for controlling the first processor,
   wherein the second processor further includes a second processor side Inter-Processor Communication (IPC) configured to transceive signals with the first processor,
   wherein the second processor is further configured to cause transmission of a suspend message to the first processor for shifting to a suspend mode and to configure the second processor side IPC to not work,
   wherein the first processor includes a first processor side IPC configured to transceive signals with the second processor,
   wherein the first processor is further configured to:
      cause transmission of a suspend response message to the second processor in response to the suspend message;
      configure the first processor side IPC to not work;
      suspend transmission of data of an Internet Protocol (IP) Multimedia Subsystem (IMS) Packet Data Network (PDN) and an Administrative PDN that are currently communicating with the first network;
      store a suspend point of said transmission of data before the second processor shifts to the suspend mode; and
      disconnect an Internet PDN that is connected to the first network after elapse of a predetermined amount of time after the second processor shifts to the suspend mode, and
   wherein the suspend message and the suspend response message are transmitted via the hardware module that is different from the first processor side IPC and the second processor side IPC.

2. The dual-modem device of claim 1, wherein:
   the first processor is further configured to cause the hardware module to transmit a suspend release message after receiving data from the first network and to configure the first processor side IPC to work; and
   the second processor is further configured to receive the suspend release message via the hardware module and to configure the second processor side IPC to work.

3. The dual-modem device of claim 2, wherein:
   the first processor is further configured to transmit the data to the second processor after configuring the first processor side IPC to work; and
   the second processor is further configured to receive the data from the first processor after configuring the second processor side IPC to work.

4. The dual-modem device of claim 1, wherein the first processor side IPC and the second processor side IPC each are Secure Digital Input Output (SDIO) modules.

5. The dual-modem device of claim 1, wherein the first processor is further configured to communicate data with the first network via the host module of the second processor.

6. A method of controlling a dual-modem device, the method comprising:
   communicating with a first network via a first processor;
   communicating with a second network via a second processor;
   controlling the first processor via a host module in the second processor;
   transceiving signals between the first processor and the second processor via a first processor side Inter-Processor Communication (IPC) in the first processor and a second processor side IPC in the second processor;
   transmitting a suspend message from the second processor to the first processor via a hardware module other than the second processor side IPC for shifting to a suspend mode and configuring the second processor side IPC to not work;
   transmitting a suspend response message from the first processor to the second processor via the hardware module other than the first processor side IPC in response to the suspend message and configuring the first processor side IPC to not work; and
   suspending, by the first processor, transmission of data of an Internet Protocol (IP) Multimedia Subsystem (IMS) Packet Data Network (PDN) and an Administrative PDN that are currently communicating with the first network;
   storing a suspend point of said transmission of data before the second processor shifts to the suspend mode; and
   disconnecting an Internet PDN that is connected to the first network after elapse of a predetermined amount of time after the second processor shifts to the suspend mode.

7. The method of claim 6, further comprising:
   transmitting a suspend release message from the first processor to the second processor after the first processor receives data from the first network and configuring the first processor side IPC to work; and
   configuring the second processor side IPC to work after the second processor receives the suspend release message.

8. The method of claim 7, further comprising:
   transmitting, by the first processor, the data to the second processor after configuring the first processor side IPC to work; and
   receiving, by the second processor, the data from the first processor after configuring the second processor side IPC to work.

9. The method of claim 6, wherein the first processor side IPC and the second processor side IPC each are Secure Digital Input Output (SDIO) modules.

10. The method of claim 6, further comprising communicating, by the first processor, data with the first network via the host module in the second processor.

* * * * *